US006560967B1

(12) United States Patent
Cohen et al.

(10) Patent No.: US 6,560,967 B1
(45) Date of Patent: May 13, 2003

(54) METHOD AND APPARATUS FOR USE WITH A GAS FUELED COMBUSTOR

(76) Inventors: Jeffrey Mark Cohen, 255 Jagger La., Hebron, CT (US) 06248; Nancy Mary Rey, 5757 Blue Hills Trail, Glastonbury, CT (US) 06033; Gonzalo J. Rey, 5757 Blue Hills Trail, Glastonbury, CT (US) 06033; Clas A. Jacobson, 138 Metcalf Rd., Tolland, CT (US) 06084

( * ) Notice: Subject to any disclaimer, the term of this patent is extended or adjusted under 35 U.S.C. 154(b) by 0 days.

(21) Appl. No.: 09/086,968

(22) Filed: May 29, 1998

(51) Int. Cl.⁷ .............................. F02C 7/232; F02C 9/28
(52) U.S. Cl. .................... 60/776; 60/39.281; 60/725; 60/737
(58) Field of Search ................ 60/39.06, 39.281, 60/725, 742, 737, 734, 776; 431/114

(56) References Cited

U.S. PATENT DOCUMENTS

| | | | |
|---|---|---|---|
| 3,053,047 A | * 9/1962 | Bodemuller | 60/39.281 |
| RE29,624 E | 5/1978 | Rimmer | 137/809 |
| 4,454,713 A | * 6/1984 | Meyer et al. | 60/39.281 |
| 4,624,285 A | 11/1986 | Perach | 137/625.65 |
| 5,070,845 A | 12/1991 | Avdenko et al. | 123/470 |
| 5,216,877 A | 6/1993 | Moore, Jr. | 60/39.29 |
| 5,303,684 A | 4/1994 | Brown et al. | 123/435 |
| 5,327,718 A | * 7/1994 | Iwata et al. | 60/39.03 |
| 5,349,811 A | * 9/1994 | Stickler et al. | 60/39.06 |
| 5,365,732 A | * 11/1994 | Correa | 60/39.281 |
| 5,388,396 A | 2/1995 | Koerner et al. | 60/39.02 |
| 5,428,951 A | * 7/1995 | Wilson et al. | 60/39.06 |
| 5,447,140 A | 9/1995 | Brisbane et al. | 123/456 |
| 5,544,478 A | * 8/1996 | Shu et al. | 60/39.03 |
| 5,578,828 A | 11/1996 | Brown et al. | 250/342 |
| 5,581,995 A | * 12/1996 | Lucenko et al. | 60/39.02 |
| 5,622,054 A | 4/1997 | Tingle | 60/737 |
| 5,706,643 A | 1/1998 | Snyder et al. | 60/39.06 |
| 5,743,079 A | * 4/1998 | Walsh et al. | 60/39.03 |
| 5,791,889 A | * 8/1998 | Gemmen et al. | 60/39.76 |
| 5,802,854 A | * 9/1998 | Maeda et al. | 60/737 |
| 5,809,769 A | * 9/1998 | Richards et al. | 60/39.06 |
| 5,865,609 A | * 2/1999 | Sowa et al. | 60/750 |
| 5,918,628 A | * 7/1999 | Harding | 137/512.1 |

FOREIGN PATENT DOCUMENTS

| | | |
|---|---|---|
| DE | 4339094 A1 | 5/1995 |
| DE | 19641843 A1 | 4/1997 |
| DE | 19636093 A1 | 3/1998 |

OTHER PUBLICATIONS

McManus et al., "Control of Thermo–Acoustic Instabilities Using Pulse Width Modulation", Proceedings of the IEEE; International Conference on Control Applications (CCA), US, vol. CONF. 6, Oct. 5, 1997, pp. 824–829.

* cited by examiner

*Primary Examiner*—Ted Kim
(74) *Attorney, Agent, or Firm*—McCormick, Paulding & Huber LLP (57) ABSTRACT

An apparatus for use in a system having a gas fuel supply and a combustor includes a fuel actuator, a controller; and a premixer. The controller generates a command signal indicative of actuation sought from the fuel actuator. The actuator receives gas fuel from the liquid fuel supply and provides liquid fuel at a modulated rate of flow in response to the command signal. The premixer receives the fuel from the actuator, mixes the fuel with air, and provides the mixture to the combustor.

27 Claims, 10 Drawing Sheets

METHOD AND APPARATUS FOR USE WITH A GAS FUELED COMBUSTOR

The subject matter herein may be disclosed and or claimed in copending application "APPARATUS FOR USE WITH A LIQUID FUELED COMBUSTOR", U.S. Ser. No. 08/996,706, now abandoned.

TECHNICAL FIELD

The invention relates to combustors, and more particularly to methods and apparatus for use with combustors employing premixed gas fuel/air mixtures.

BACKGROUND ART

Gas turbine engines are well known. A typical gas turbine engine has an annular, axially-extending flow path for conducting working fluid sequentially through a compressor section, a combustion section, and a turbine section. The combustion section mixes the working fluid, typically air, with fuel and ignites the fuel/air mixture.

Gas turbine engines typically burn fossil fuels. An undesired result of this combustion is the formation of nitrogen oxides, frequently referred to as NOx. Nitrogen oxides are pollutants capable of causing health and environmental problems. Government standards establish limits on the amounts of NOx that may be discharged into the air.

The rate of NOx production within the gas turbine engine directly depends on the temperature within the combustion chamber. In turn, the chamber temperature depends on the ratio of fuel to air in the mixture. The greatest chamber temperature and, thus, the greatest rate of NOx production result when the combustible fuel/air mixture has a stoichiometric fuel to air ratio, commonly referred to as "stoichiometric" mixture. A mixture having a fuel to air ratio that is less than stoichiometric, commonly referred to as a "lean" mixture, results in a lower temperature and a lower rate than that of a stoichiometric mixture. Increasing the leanness of a lean mixture results in an even lower temperature and an even lower rate of NOx production.

When using a lean mixture to attain a low rate of NOx production, it is desirable to mix the gaseous fuel and a large fraction of the air before they reach the combustor. This approach, commonly referred to as "premixing", uses a premixer to increase the uniformity of the mixture provided to the combustor. The fuel spends enough time within the premixer to ensure that it adequately mixes with the air. This time, typically referred to as residence time, might be about 1 or 2 milliseconds ("msec") but is more commonly about 4 msec. Without premixing, some regions within the combustor end up with an extremely lean mixture while others end up with a less lean, i.e., richer, closer to stoichiometric, mixture. Greater uniformity in the fuel to air ratio of the mixture results in a lower peak temperature within the combustor and hence less NOx.

However, even when premixing is employed, other considerations can effectively limit the leanness of the mixture. Mixtures that are too lean do not permit sustained combustion and ultimately result in a "flame-out" condition commonly referred to as "lean blowout". Furthermore, lean mixtures having a slightly higher fuel to air ratio enable sustained combustion, but can result in oscillations in both the magnitude of the pressure and the heat release rate within the combustor. In some situations, the time relationship between these two oscillations is such that the oscillations in the magnitude of the combustor pressure cause an increase in the amplitude of oscillation in the heat release rate, and vice versa. This condition, commonly referred to as combustion instability, causes large oscillations in the magnitude of the pressure within the combustor. The repetition rate or frequency of these oscillations depends on the application. For industrial gas turbine engines, the frequency is typically within a range of about 100 Hertz ("Hz") to about 700 Hz, most often around 200 Hz. Thus, the period or duration of an oscillation is most often about 5 msec. The presence of combustion instability can lead to problems including engine damage. The possibility that combustion instability will occur could preclude the use of a fuel to air ratio that is only slightly above the lean blowout limit.

One technique for passive control of combustion instability involves injection of a secondary, or pilot, fuel mixture into a side wall of the combustor. U.S. Pat. No. 5,263,325 to McVey et al. discloses an example of this technique. However, the use of pilot fuel injection cannot sufficiently reduce combustion instability without also causing a significant increase in the rate of NOx production.

Several references disclose active control of combustion instability. For example, U.K. Patent Application GB 2239691A discloses an active control which uses a pressure transducer to measure pressure fluctuations in the combustion chamber and a servovalve to modulate the amount of fuel supplied for combustion U.S. Pat. No. 5,145,355 to Poinsot et al. discloses an apparatus that detects combustion instability and modulates the flow of fuel injected into the chamber as a function of the instability. U.S. Pat. No. 5,575,144 to Brough discloses a system that senses pressure pulses in the combustor, calculates a cancellation pulse to offset a predominate pressure pulse, and periodically extracts metered volumes of air from the combustor to produce a cancellation pulse. However, none of these references disclose a system for use with a combustor that burns a premixed gaseous fuel/air mixture.

U.S. Pat. No. 5,445,517 to Kondou et al. discloses an adaptive noise silencing system for a combustor. The system computes an anti-phase signal of a combustion noise and inputs the signal to a gas flow control valve, thereby producing a pressure variation in the gas fuel and realizing a pressure variation in the combustion chamber to suppress, by phase interference, the combustion noise. This system employs a mixing chamber between the gas flow control valve and the combustor chamber. However, all of the fuel flows through the gas flow control valve.

U.S. Pat. No. 5,349,811 to Stickler et al. discloses a system for reducing the formation of NOx pollutants. The system "modulate[s]" the fuel delivery rate to the combustor to produce combustor air input flow oscillation and bulk flow oscillation within the combustor which enhances fuel/air homogeneity throughout the combustion chamber and reduces conditions favorable to the formation of NOx. However, Stickler does not disclose the use of such system with a combustor that burns a premixed gas fuel/air mixture, but rather as an alternative to premixing.

DISCLOSURE OF THE INVENTION

An object of the present invention is to provide an apparatus that provides a premixed gas fuel/air mixture having a temporally modulated stoichiometry, i.e., fuel to air ratio.

Another object of the present invention is to provide an apparatus for controlling the magnitude of combustion instability in a combustor that burns premixed gas fuel/air mixtures.

Another object of the present invention is to provide an apparatus for controlling the magnitude of oscillations in the pressure within the combustor in a gas turbine engine that burns premixed gas fuel/air mixtures.

Another object of the present invention is to provide an apparatus that can control the magnitude of combustion instability without significantly increasing the rate of NOx production within the combustor.

According to a first aspect of the present invention, an apparatus for use in a system having a gas fuel supply and a combustor includes a premixer in flow communication with the combustor, a first fuel line in substantially non-modulated fuel flow rate communication between the fuel supply and the premixer, and a second fuel line in modulated fuel flow rate communication between the fuel supply and said premixer. The modulated fuel flow rate communication is adapted to substantially reduce the magnitude of fluctuations in the magnitude of the pressure in the combustor.

According a second aspect of the present invention, a fuel system for use in a system having a gas fuel supply and a combustor includes a fuel actuator that receives gas fuel and provides, in response to a command signal from a controller, gas fuel at a modulated rate of flow, and further includes a premixer that receives gas fuel from the actuator and another source, such that the gas fuel received from the actuator at the modulated rate of flow represents only a portion of the fuel flow to the premixer. The premixer mixes the fuel with air, and provides the mixture to the combustor.

According to a third aspect of the present invention, a fuel system for use in a system having a gas fuel supply and a combustor includes a fuel actuator that receives gas fuel and provides, in response to a command signal from a controller, gas fuel at a modulated rate of flow, and further includes a pressure actuated fuel valve that receives gas fuel from the actuator at a first modulated rate of flow and provides, in response, gas fuel at a second modulated rate of flow, and further includes a premixer that receives gas fuel from the pressure actuated fuel valve, mixes the fuel with air, and provides the mixture to the combustor.

According to a fourth aspect of the present invention, a controller for use in a system having a fuel actuator that receives gaseous fuel and a command signal and provides, in response to the command signal, gaseous fuel at a modulated flow rate to a premixer that receives the modulated fuel flow from the fuel actuator, mixes the fuel with air, and provides the gaseous fuel and air mixture to a combustor, includes means for determining the actuation sought from the fuel actuator to cause the actuator to provide gaseous fuel at the modulated flow rate, and means for generating a command signal indicative of said actuation sought from the fuel actuator.

As used herein, the term modulation does not include quasi steady operation such as that universally employed within gas turbine engines to change the rate of fuel flow to the burner in response to a change in an engine operating condition. Those fuel rate changes typically occur very slowly, often over a duration of many seconds or even minutes. Contrast the modulated fuel rate of the present invention which changes at a faster periodic rate, typically but not limited to hundreds of Hertz ("Hz").

While systems employing modulation of the fuel flow rate to a combustor are known, until now, in regard to mixing prior to combustion, such systems fed all of the fuel to a mixing chamber through a flow control valve. While this may help ensure sufficient control authority and spatial uniformity of flow rate into the mixing chamber, it has the disadvantage that an excessively large valve may be required. Such a valve may not be capable of providing the desired modulation magnitude and frequency. However, it has been determined that all of the fuel flow to a premixer need not be modulated, i.e. only a portion of the fuel flow need have a modulated flow rate. In one embodiment, for example, the modulated fuel flow rate comprises as little as a minority of the total fuel flow to the premixer. Other other embodiments progressively smaller fractions of the total fuel flow may be employed, e.g., one third, one fifth, one tenth, one twentieth, on fiftieth. Progressively smaller fractions may for example offer the opportunity to use smaller, faster responding, lighter weight, or lower power comsumption actuator valves.

These and other objects, features and advantages of the present invention will become more apparent in light of the following detailed description of exemplary embodiments thereof, as illustrated in the accompanying drawings.

BEST MODE EMBODIMENT FOR CARRYING OUT THE INVENTION

Figure 1:
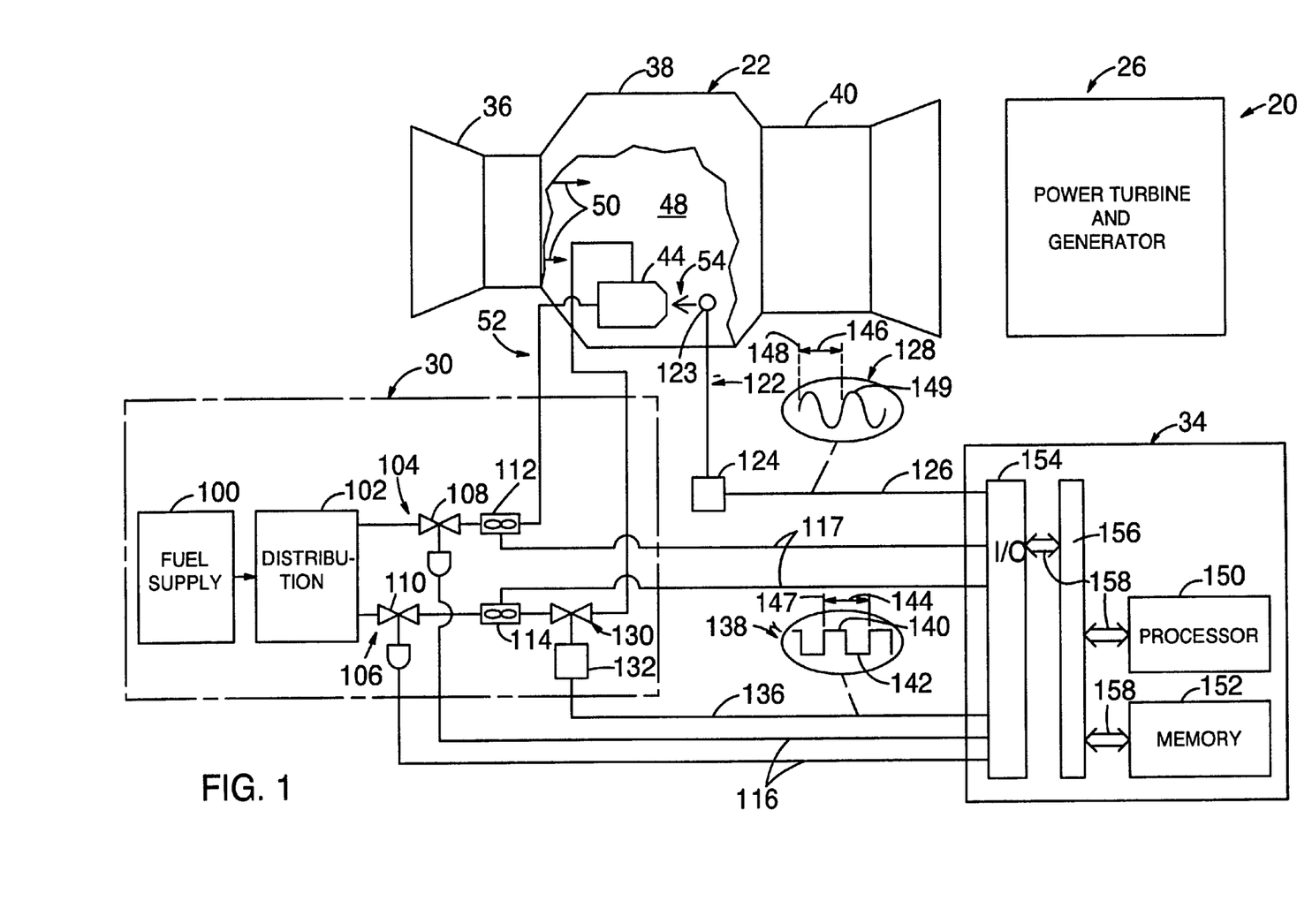
FIG. 1 is a side view, partially cut away of a gas turbine power plant together with a schematic of an exemplary embodiment of a control system of the present invention.

The present invention is disclosed herein with respect to a best mode embodiment for use in a gas turbine power plant of the type illustrated in FIG. 1. The gas turbine power plant 20 includes a gas turbine engine 22, a power turbine and generator 26, a fuel system 30, and an engine control 34. The gas turbine engine receives fuel from the fuel system 30 under direction of the engine control 34, and burns the fuel to thereby power the power turbine and generator 26.

The gas turbine engine 22 includes a compressor 36, a burner 38 (shown partially broken away for clarity), and a turbine 40. The burner 38 typically includes a plurality, e.g. sixteen, of premixers represented by a premixer 44, and a combustor 48. The premixers 44 may be circumferentially spaced around an upstream end of the burner 38. The combustor 48 is preferably annular and located downstream of the premixers 44. The premixers receive and mix compressed air 50 from the compressor 36 with fuel, provided by way of a plurality of fuel lines 52 from the fuel system 30. The premixers 44 ideally provide a mixture, that is spacially substantially uniform, to the combustor 48 which then burns it. Supplying the combustor 48 with a uniform mixture helps to minimize the rate of NOx production within the combustor.

The fuel system 30 may include a gaseous fuel supply 100 and a distribution network 102 which supply fuel to a plurality of fuel lines, represented by a first fuel line 104 and a second fuel line 106. Each of the fuel lines 104, 106 may include a regulator 108, 110 and a meter 112, 114. The regulators 108, 110 may be valves, e.g. servo valves, electrically connected to the engine control 34 by way of signal lines 116. The meters 112, 114 may be flow meters, e.g. turbine flow meters, electrically connected to the engine control 34 by way of signal lines 117. The first and second fuel lines 104, 106 connect to the plurality of fuel lines 52 that supply fuel to the premixers 44.

The engine control 34 provides electrical signals that command the regulators 108, 110 and thereby establish the fuel flow rates through the regulators 108, 110. These rates in turn establish the average fuel flow rates through the fuel lines 104, 106 and the average fuel to air ratio of the mixture provided to the combustor 48. The meters 112, 114 provide the engine control with electrical signals indicative of the actual fuel flow rates through the regulators 108, 110. The flow rates through the regulators 108, 110 are typically quasi steady, meaning any change in the rates typically occur very slowly, often over a duration of many seconds or even minutes.

Figure 4:
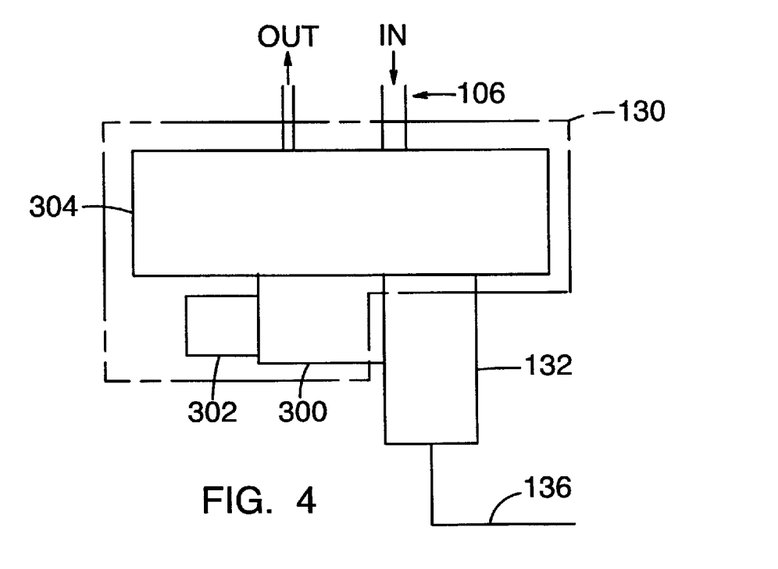
FIG. 4 is a side view of an actuator valve that may be used in the control system of FIG. 1

The second fuel line 106 further includes a fuel actuator 130 that modulates the fuel flow rate through the second fuel line 106. The fuel actuator may comprise a valve, for example, an "on/off" valve, and a valve driver 132 electrically connected to the engine control 34 by way of signal lines 136. Although not limited to such, an "on/off" valve may comprise a solenoid valve having a pintle/orifice arrangement. In practice, an "on/off" valve may alternatively comprise a proportional type valve modified to operate in an on/off fashion, i.e., to cause the valve to fully open or fully close as quickly as possible. Referring now to FIG. 4, in such alternative, the actuator may comprise a Series D633 spool and bushing valve 300, a linear motor 302, and valve driver electronics 132, all commercially available from MOOG, and a manifold. The valve driver electronics are adapted to operate the valve as an "on/off" valve.

The fuel to air ratio of the mixture is preferably lean, more preferably just slightly above the lean blowout limit. This ratio enables sustained combustion and helps to minimize the rate and amount of NOx produced in the combustor. However, as described hereinbefore in the Background Art section, this ratio may result in combustion instability, whereby oscillations in the magnitude of combustor pressure have the effect of increasing the amplitude of the oscillation in the heat release rate, and vice versa. Combustion instability causes large oscillations in the magnitude of the pressure within the combustor.

Figure 5:
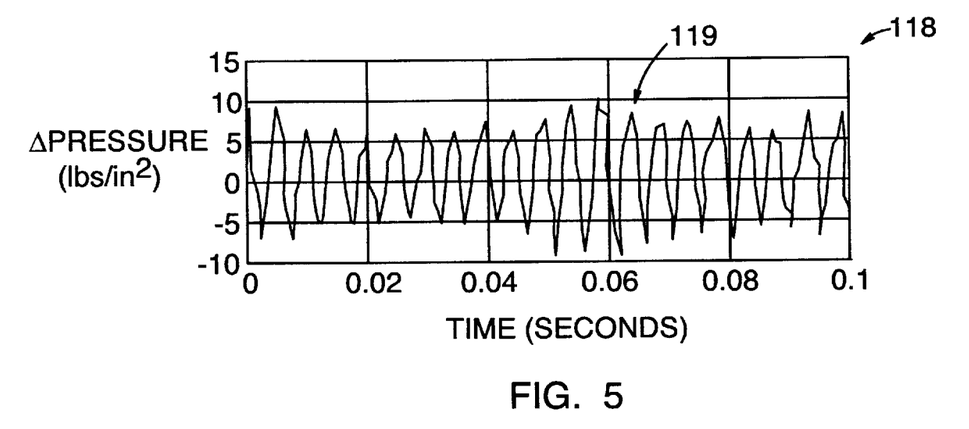
FIG. 5 is a graph illustrating the magnitude of the oscillations in the pressure of a combustor portion of the gas turbine power plant of FIG. 1.
Figure 6:
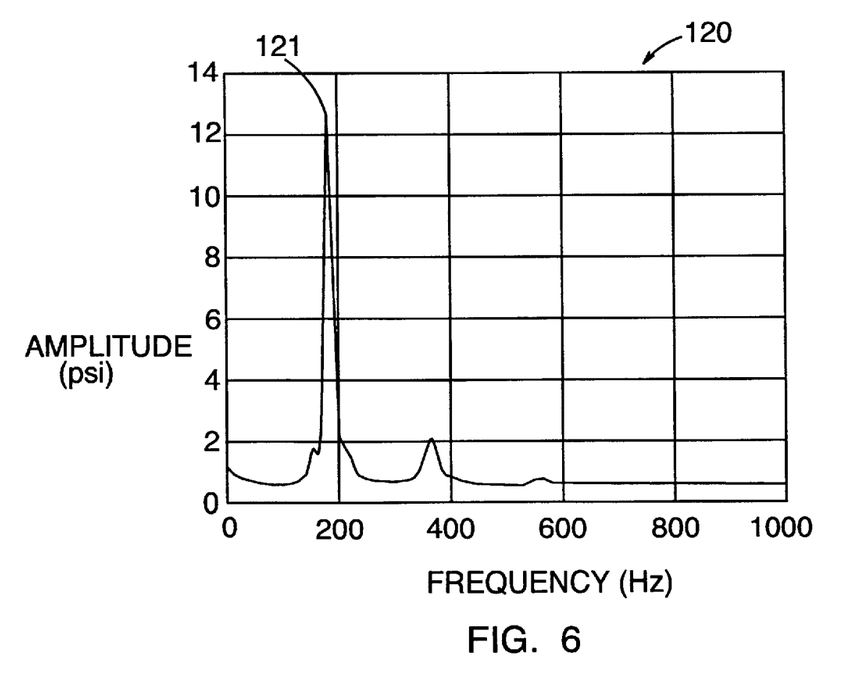
FIG. 6 is another graph illustrating the magnitude of the oscillations in the combustor pressure during a period of typical combustion instability.

Referring now to FIG. 5, a graph 118 has a curve 119 illustrating that the peak-to-peak magnitude of such oscillation can be on the order of 20 pounds per square inch ("psi"). Referring now to FIG. 6, a graph 120 has a curve 121 illustrating that the magnitude of the oscillations can be represented as a plurality of frequency components, each having a different magnitude compared to that of the others. The frequency components with highest magnitudes are usually within a relatively narrow frequency range, referred to herein as the fundamental frequency range of the oscillation.

Referring again to FIG. 1, the gas turbine engine 22 further includes a sensor 122 that provides a signal indicative of the presence of combustion instability. In the best mode embodiment, the sensor 122 is a pressure sensor that senses the pressure in the combustor, although any other suitable type of sensor may be used, including but not limited to a thermal sensor, a light sensor, or a vibration sensor. The pressure sensor may comprise a probe 123, located within the combustor 48, and a remote transducer 124 electrically connected to the engine control 34 by a signal line 126. The pressure sensor provides a signal having a magnitude, shown simplified over a time duration in a graph 128, indicative of the oscillations in the magnitude of the pressure in the combustor.

The engine controller 34 preferably comprises a processor 150, a memory 152, an input/output (I/O) portion 154 and a bus 156 with connections 158 to each of the elements of the controller 34.

The engine controller provides a command signal on line 136 in response to the signal on line 126 from the sensor 122. The command signal commands the actuator 130 and results in a modulated fuel flow rate through the fuel line 106 to the premixers 44. In turn, the premixers provide a mixture having a temporally modulated stoichiometry to the combustor 48. The modulation of the fuel flow rate effectively alters the time relationship, i.e., the phase relationship, between the oscillations in the magnitude of the combustor pressure and the oscillations in the heat release rate. This alteration brings about a decrease in the coupling between the oscillations and consequently, a decrease in the magnitude of the oscillations in the combustor pressure.

In one embodiment the command signal has a magnitude, shown simplified over a time duration in a graph 138, that represents commands to the valve to periodically "open" 140 and "close" 142. This causes the valve to periodically modulate the fuel flow "on", corresponding to maximum flow rate through the valve, and "off", corresponding to minimum flow rate through the valve. The length of the period 144 of an "on/off" cycle is preferably substantially equal to the length of the period 146 of the oscillation in the magnitude of the combustor pressure. The controller preferably delays, or phase shifts, the start time 147 of an "on/off" cycle relative to the start time 148 of the oscillations in the magnitude of the combustor pressure. The magnitude of the time delay, or phase shift, may be selected so as to result in maximum decrease to the magnitude 149 of the combustor pressure oscillations. The modulation preferably has a duty cycle of about 50%, i.e., "on" for about 50% of the period 146 and "off" for about 50% of the period. This duty cycle provides a symmetry similar to that of the typical oscillations in the magnitude of the combustor pressure. It also results in an average fuel flow rate through the actuator 130 that is about one half of the "on" fuel flow rate through the actuator.

Figure 2:
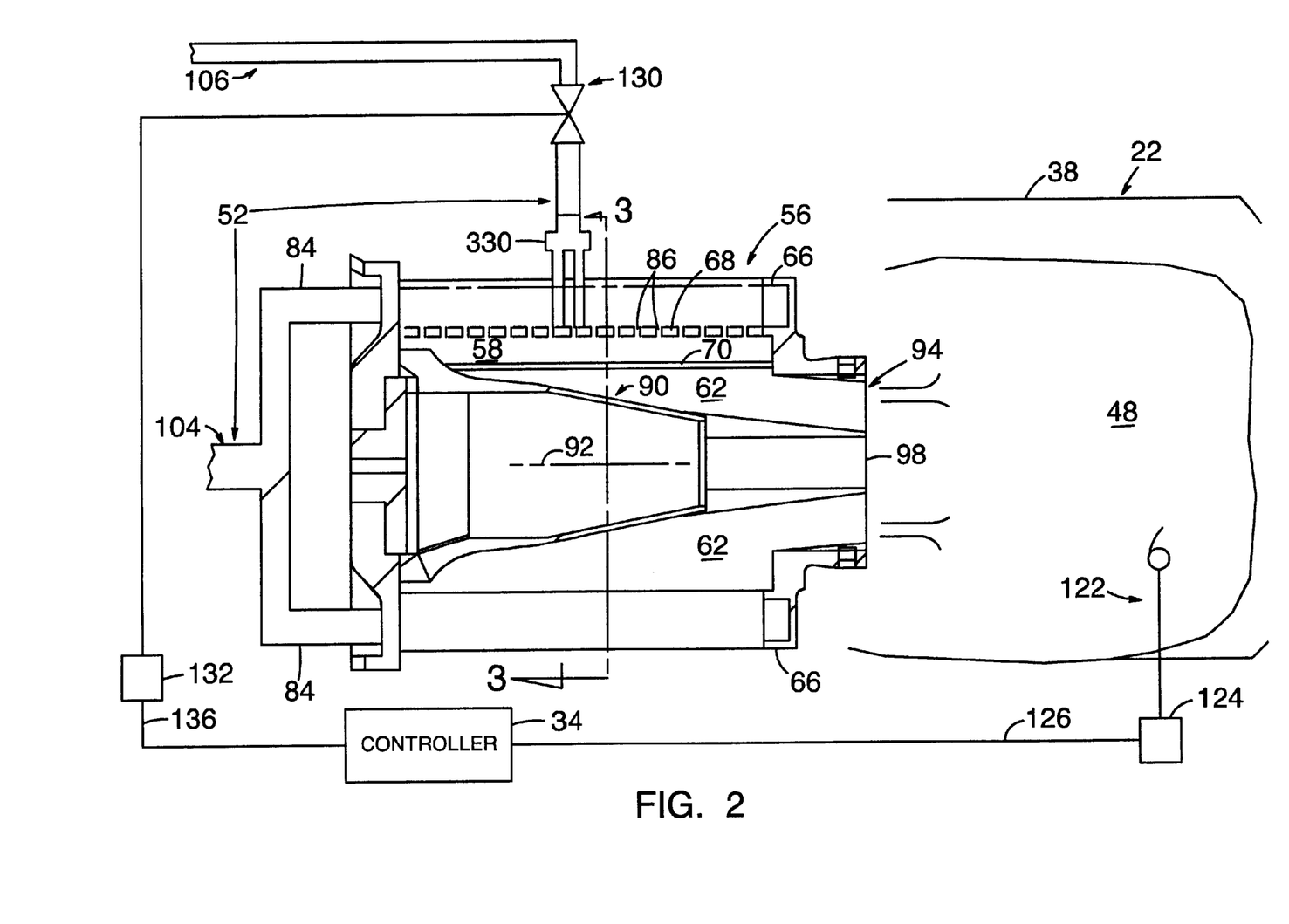
FIG. 2 is a side view, partially in cross section, taken in the direction of the lines 2—2 of FIG. 3, of a premixing fuel nozzle together with a schematic representation of a gas fuel actuator, a controller, and a sensor used in the best mode embodiment of the control system of FIG. 1.
Figure 3:
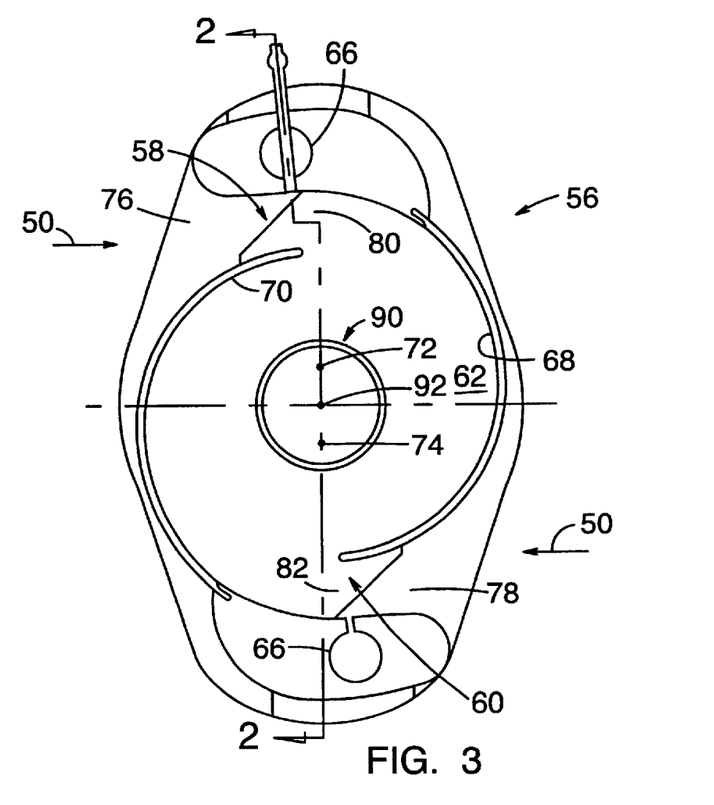
FIG. 3 is a cross section view, taken in the direction of the lines 3—3 of FIG. 2, of the premixing fuel nozzle of FIG. 2.

Referring now to FIGS. 2 and 3, each of the premixers 44 may comprise a tangential air entry premixing fuel nozzle 56. Such nozzles are well known. A preferred premixing fuel nozzle 56 may include one or more air passages 58, 60, a mixing chamber 62, and a plurality of fuel tubes 66. The air passages and mixing chamber may be formed by two partial cylinders 68, 70 having longitudinal axes 72, 74 (FIG. 3) offset from one another. The air passages 58, 60 each have an inlet 76, 78 (FIG. 3) that receives compressed air 50 from the compressor 36 (FIG. 1) and a vent 80, 82 (FIG. 3) that communicates with the mixing chamber 62. Each fuel tube 66 has an inlet 84 connected to one of the plurality of fuel lines 52 and a plurality of fuel injection orifices 86, e.g. fifteen, that communicate with the mixing chamber 62. The main fuel injection orifices are preferably designed to provide good fuel/air mixing. The fuel injection orifices 86 may have differing cross sectional areas, e.g., 7 of the 15 may have a cross sectional area of about 1.5 times the cross sectional area of the 8 others, to improve mixing and facilitate flame disgorgement. Each fuel tube 66 may receive equal portions of the total fuel flow to the premixing nozzle 56, although this apportionment is not an absolute requirement.

The premixing nozzle 56 further includes a center body 90, positioned with a longitudinal axis 92 centered radially within the mixing chamber, and an outlet 94 (FIG. 2). The center body 90 is preferably conical with a closed downstream end 98. Air and fuel mix within the mixture chamber 62 and the mixture exits the nozzle at the outlet 94.

The fuel should spend enough time within the mixing chamber 62 to ensure that it adequately mixes with the air. A time period of at least about 3 or 4 msec is preferred, although lesser times, e.g., about 1 or 2 msec will suffice in some embodiments. The compressed air preferably spends on the order of about 8 msec traveling from the air passage inlets 76, 78 to the outlet 94 of the premixing nozzle 56.

As described hereinabove, the fuel actuator provides the modulated fuel flow rate to the premixer. It is desirable have the fuel with the modulated flow rate mix with the air in the premixer to substantially the same extent that the fuel with the non modulated fuel rate mixes with the air in the premixer. This limits the variation in the fuel/air ratio at the exit of the premixer and leads to lower NOx production. For this reason the fuel at the modulated flow rate is preferably injected into the mixing chamber through one or more of the fuel injection orifices. An injection manifold 330 may be provided to provide a flow path to the injection orifices.

It is also prefered, to maintain the ability to control, with the modulated fuel flow, the temporal character of the spatially-averaged fuel/air ratio at the exit of the premixer. The ability to obtain good spatial fuel/air mixing while maintaining control of the temporal variations in fuel/air ratio leads to maximum actuator authority without adversely affecting NOx production.

In one embodiment, the injection manifold 330 communicates directly with two injection orifices. These two orifices are in or near the middle of the injection orifice array in order to balance two concerns: the need to mix the fuel with the passing air thoroughly and the desire to keep these unsteady fuel jets from impacting on solid surfaces, such as the centerbody.

In order to minimize the effects of fuel compressibility, it is preferable to minimize the volume of the injection manifold 330 between the injectionorifices and the practical location of the fuel actuator 130. Approximately 10–20% of the total average fuel flow rate was passed through the actuated fuel system in this configuration. This preferably corresponds substantially to the amount of fuel that is passed through two orifices of this size in the portion of the injection orifice array that passes fuel at a non modulated flow rate. However, greater and lesser percentages may also be employed.

It is typically desirable to position the first actuator close to the premixer so as to minimize the distance (which minimizes the volume of the fuel line) between the actuator and the point at which the modulated fuel flow is injected into the premixer. Because the gaseous fuel is compressible, the fuel flow rate experiences a reduction in modulation, i.e., smooths out, downstream of the actuator. The magnitude of the reduction increases as the distance from the actuator increases. Minimizing the distance between the actuator and the premixer minimizes the reduction, thereby helping to ensure that the premixer receives the desired modulated fuel flow rate. Likewise the fuel line between the actuator and the premixer is preferably as straight as possible.

The benefit of having the actuator supply only a portion of the total fuel flow rate to the premixer is that it reduces the average flow rate through the actuator, thereby making the actuator easier to design and manufacture, while still reducing combustion instability.

In an alternative embodiment, the fuel actuator 130 may comprise a proportional valve, for example, a Series D633 spool and bushing valve 300, a linear motor 302, and valve driver electronics 132, all commercially available from MOOG, and a manifold. In such an embodiment the modulation in the fuel flow rate may be chosen to be proportional to the magnitude of the fluctuations in the combustor pressure. For example, the command sent to the valve may be in accordance with the following equation.

$$\text{Command}=K_1+K_2*(P(t-T)),$$

where
$K_1$ represents a dc flow component
$K_2$ represents a gain factor
$P(t)$ represents the magnitude of the fluctuation in the combustor pressure, and
$T$ represents a time or phase delay.

For example, $K_1$ may be chosen to correspond to the desired time average flow rate. $K_2$ may be chosen to provide maximum authority while avoiding saturation of the valve. $T$ may be chosen to minimize $P(t)$.

Any other suitable actuator and modulation may also be used, including but not limited to a sinusoidally modulated fuel flow rate.

In some embodiments, it is not practical to position the actuator near the premixer. This is because the first fuel actuator is typically not suited to the conditions, e.g., temperature, found within the engine. Locating the actuator outside of the engine can result in a substantial distance between the actuator and the premixer.

Figure 7:
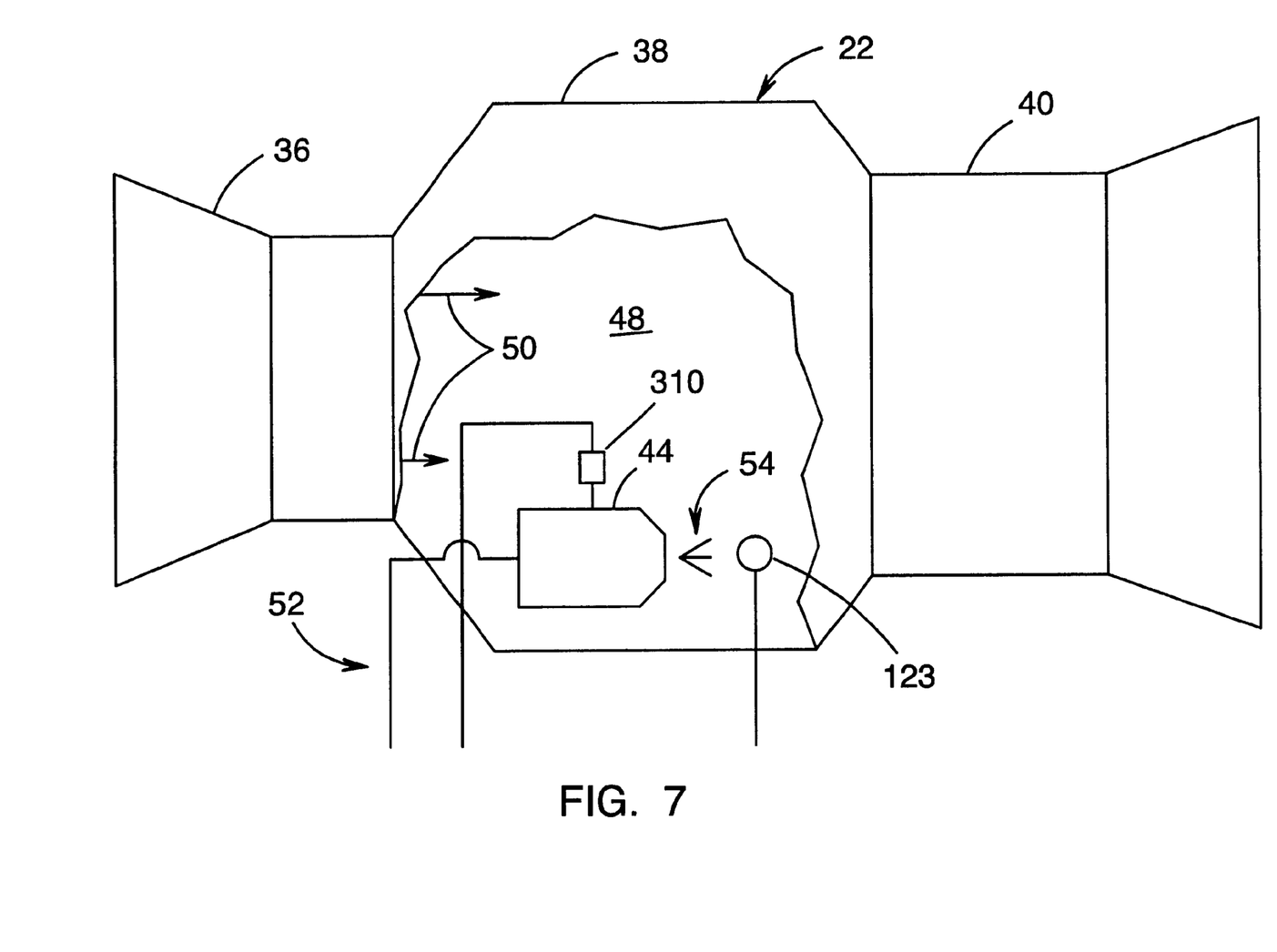
FIG. 7 is a side view, partially cut away of the gas turbine engine in FIG. 1, together with a pressure actuated fuel valve which may be used in the control system of FIG. 1.
Figure 8:
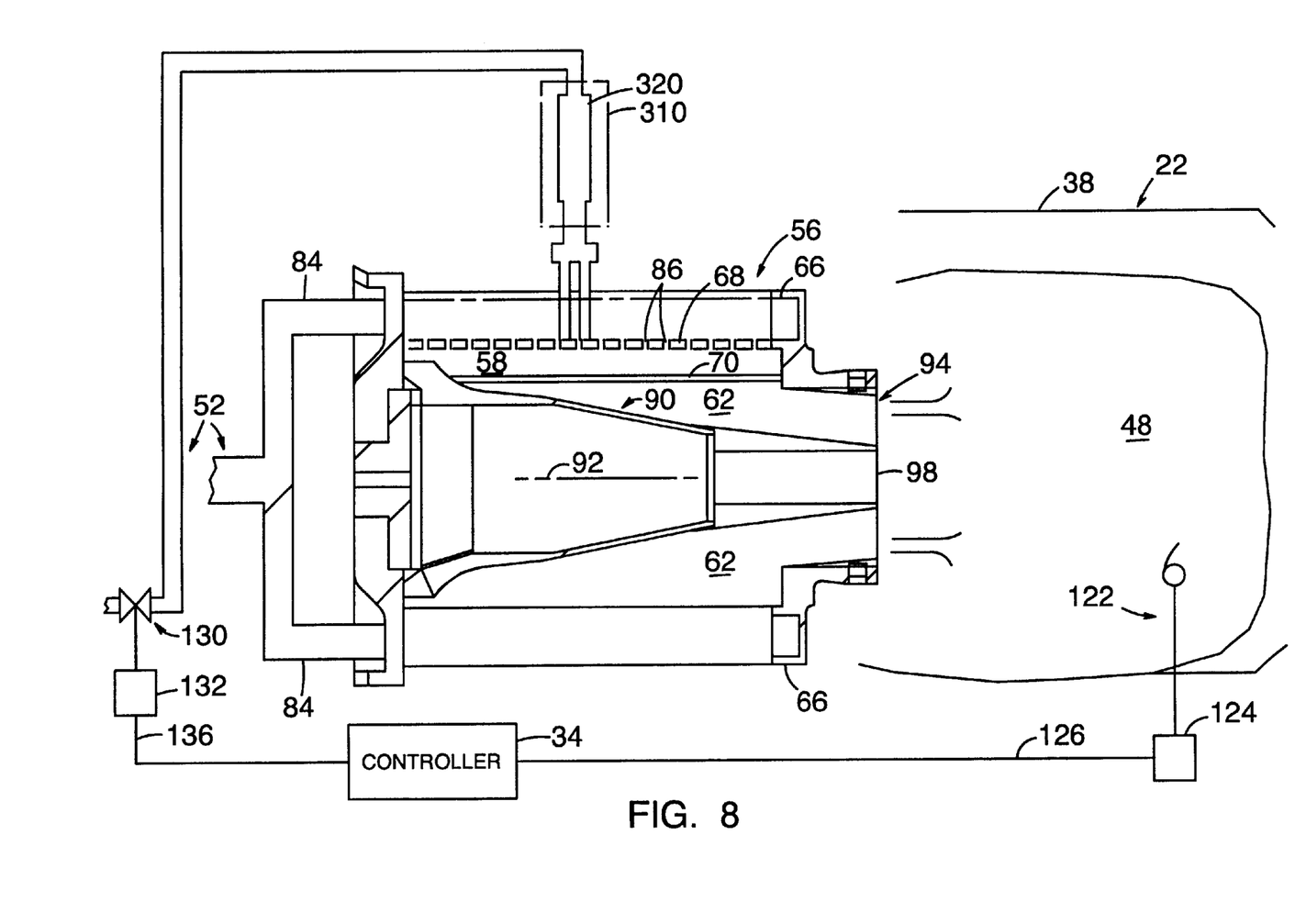
FIG. 8 is a side view, partially in cross section, taken in the direction of the lines 2—2 of FIG. 3, of the premixing fuel nozzle of FIG. 2 together with a side view representation of the pressure actuated fuel valve of FIG. 7.

Thus, referring now to FIGS. 7 and 8, the fuel system may further include a second fuel actuator 310 disposed between the first actuator 130 and the premixer 56. The second fuel actuator 310 helps to reduce the effect of the gas compressibility in regard to the rate of fuel flow to the premixers. The second actuator is preferably disposed as close to the premixer and the point of fuel injection as possible (possibly in the core of the engine). The second fuel actuator may be an "on/off" valve, preferably a mechanical poppet valve 320 (FIGS. 8,9), actuated by the pressure of the gas in the line downstream of the first actuator.

Figure 9:
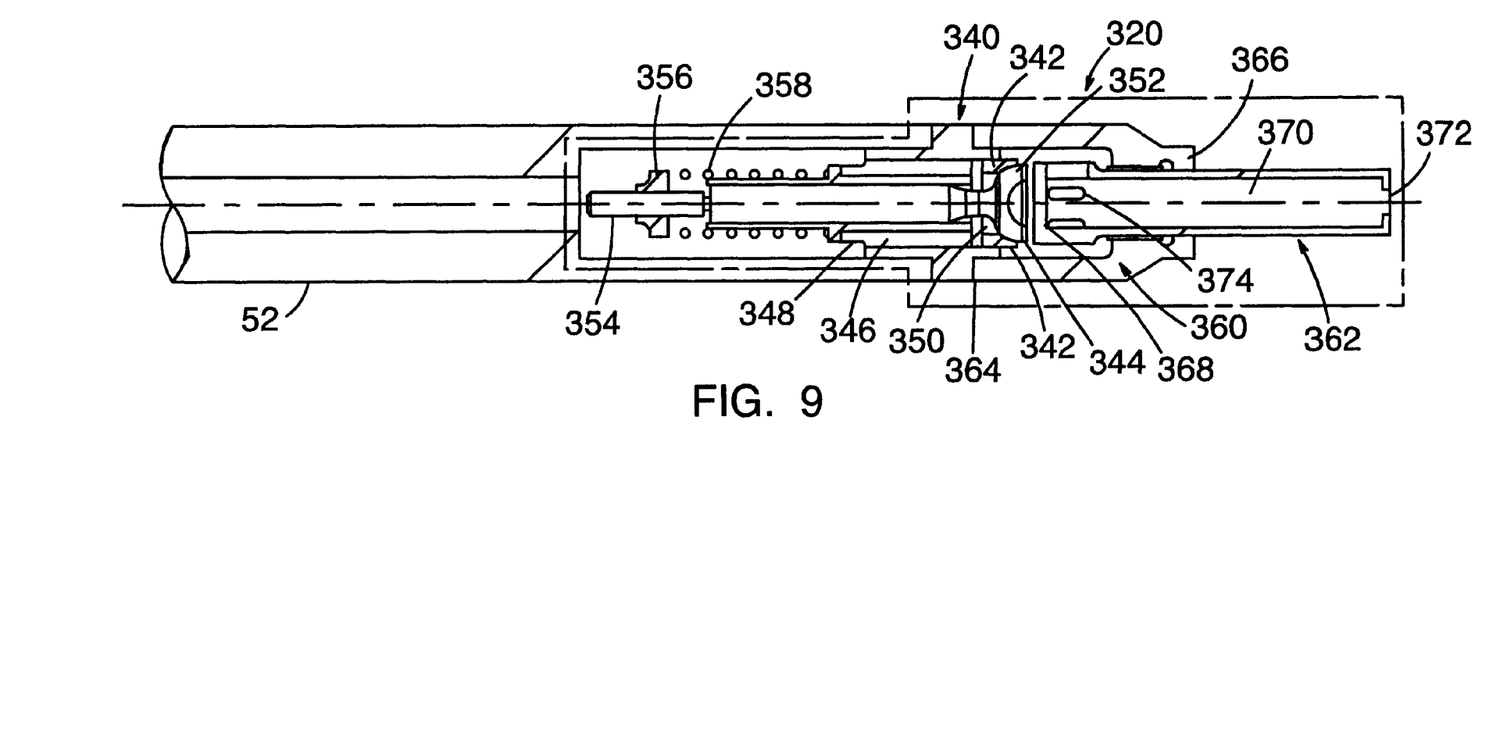
FIG. 9 is a side view, in cross section of a mechanical, fuel pressure actuated poppet valve.

Referring now to FIG. 9, the poppet 320 has a valve body 340, a seat 342, and a movable pintle 344. The valve body 340 has a passage 346 with an inlet 348, which flow communicates with the upstream fuel line 52, and an outlet 350. The passage 346 provides the flow path for the gaseous fuel. The seat 342 is pressed into the valve body adjacent to the outlet. The pintle 344 has a head 352 and a shaft 354. The head is shaped to mate with the seat. The shaft extends through a hole in the body. The shaft has a threaded end that receives a nut 356. A spring 358 is disposed between the body 340 and the nut 356.

The poppet 320 further includes a coupling 360 and a tip 362. The coupling has two open ends 364, 366. One end 364 is welded to the valve body; the other end 366 provides threaded engagement with the tip. The tip is tubular with a walled end 368, a cavity 370, and an outlet 372. The walled end 368 limits the motion of the pintle. The tip further includes a plurality of circumferentially spaced channels 374 disposed proximate to the walled end and in flow communication with the cavity 370. Once the tip is threaded into the coupling, the tip and the coupling are welded together to prevent relative motion between the tip and the coupling.

The poppet operates as follows. The spring applies a force on the nut and thereby forces the head of the pintle toward the seat (i.e., in the closing direction). The pressure of the gas in the passage results in a force on the head opposite in direction (i.e., in the opening direction) to that produced by the spring. When the magnitude of the force in the closing direction exceeds that from the gas pressure (i.e., in the opening direction) the head of the pintle mates with the seat and thereby blocks the passage outlet, thereby blocking the flow path and preventing fuel flow. As the magnitude of the force from the gas pressure (i.e., in the opening direction) exceeds that from the force in the closing direction, the head of the pintle moves away from the seat and thereby opens the flow path. The magnitude of the pressure reqired to open the flow path is commonly referred to as the "cracking" pressure.

The poppet is typically calibrated after it is partially assembled but prior to completing the poppet assembly process. In a typical scenario, the seat and the pintle are installed in the body, and the spring and the nut are situated on the shaft. The location of the nut is then adjusted so as to result in a desired "cracking" pressure. Adjusting the location of the nut changes the magnitude of the force from the spring. An adhesive, e.g., LOCTITE high-temperature adhesive, is used to secure the nut to the shaft. The partially assembled poppet is then inserted into and welded to the upstream fuel line. The tip is screwed into the coupling and the coupling is welded onto the body. The poppet is then tested to determine its flow capacity. If the flow capacity is too high, or if the poppet displays a resonance problem, the position of the stop is adjusted to limit the stroke of the pintle. The tip location relative to the coupling is adjusted so as to position the stop at a desired location. However, when open, the clearance between the seat and the head of the pintle is preferably large enough to enable expected contaminants to pass through the poppet valve. The tip is then welded to the coupling. However, an alternative to the internal spring and nut arrangement may be sought in order to enable adjustment to the crack pressure without disassembly of the poppet. The cracking pressure is preferably set to at least about 500 psi, i.e. at least about two times the maximum expected combustor pressure of 250 psi. The supply pressure is preferably about 600 psi.

The angle of the seat and the diameter of the pintle are preferably adapted to provide the required flow at the prevailing system pressures while still providing a suitable stroke length and leakage characteristics. The flow capacity of the poppet depends in large measure on the angle of the seat and the diameter of the pintle. The seat angle is preferably large enough to prevent the pintle from sticking to the seat due to friction.

The poppet components described above preferably comprise Inconel due to the high temperature within the engine. However, in some embodiments, the components may be cooled by applying a nitrogen purge through the poppet when not actuating the valve/poppet.

Figure 10:
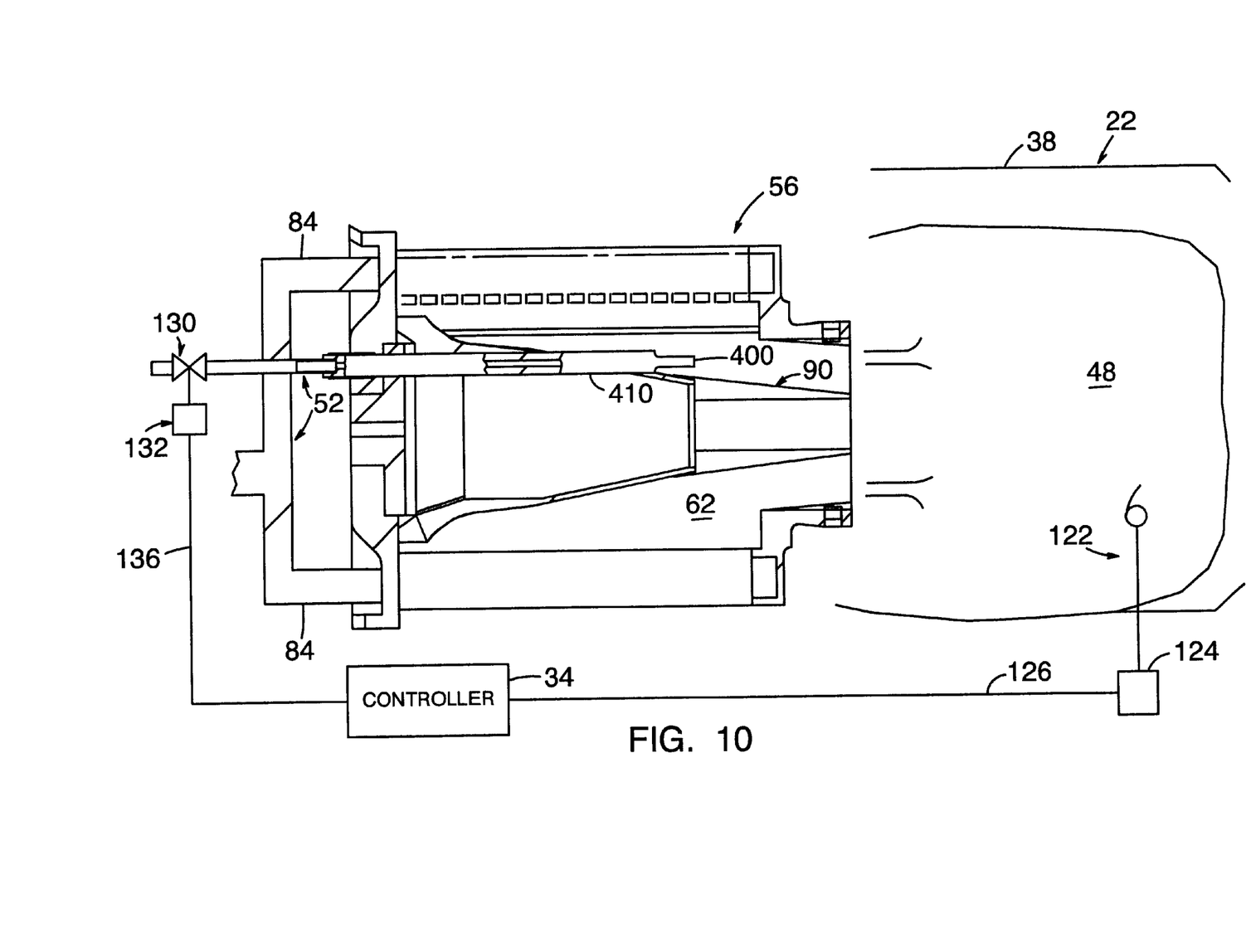
FIG. 10 is a side view, partially in cross section, taken in the direction of the lines 2—2 of FIG. 3, of the premixing fuel nozzle of FIG. 2 together with a side view representation of a pressure actuated fuel valve in communication with a fuel injection spoke mounted internally to the premixer.

Referring now to FIG. 10, another embodiment comprises substantially the same components as described above except that the modulated fuel flow may be injected into the mixing chamber of the premixer from a centerbody-mounted spoke 400. Nozzles having fuel injection spokes are commonly used for fuel premixers. U.S. Pat. No. 5,461,865 to Snyder et al. and U.S. Pat. No. 5,479,773 to McCoomb et al. disclose two examples. This embodiment may or may not employ a poppet valve 410. The poppet 410 is substantially the same as the poppet 320 described hereinabove except for its tip.

Figure 11:
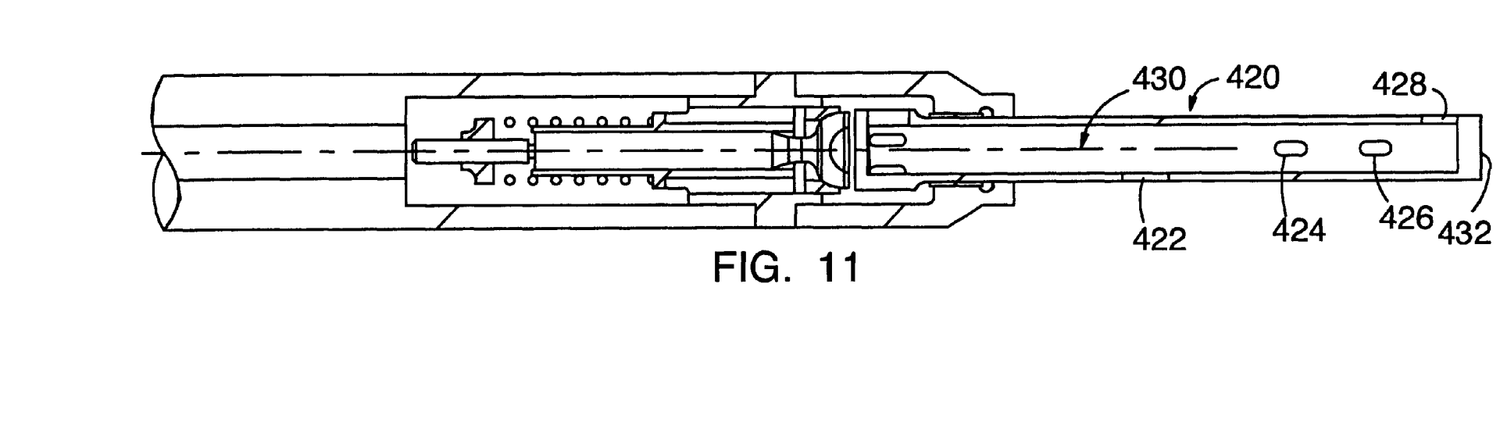
FIG. 11 is a side view, in cross section of the pressure actuated fuel valve of FIG. 10.

Referring now to FIG. 11, in the embodiment of FIG. 10 In such embodiment, the tip 420 preferably has a plurality of circumferentially and axially spaced outlets 422, 424, 426, 428 in communication with a cavity 430 of the tip 420 and the mixing chamber 62 of the premixer 56. The outlets 422, 424, 426, 428 are located at four different axial positions (75%, 50%, 25%, 0) on the spoke tip, as measured from a downstream end 432. They are preferably located at three different azimuthal locations, however. The two center holes 424, 426 are oriented to inject fuel radially away from the centerbody, and are preferably the same size as each other, with a flow area of 0.066 sq. in. The most upstream hole 422 is 50% larger (0.099 sq. in.) than the center holes and is located at an azimuthal position −90 degrees from the centerbody radial direction. The most downstream hole 428 is 50% smaller (0.033 sq. in.) than the center holes and is located at an azimuthal position −90 degrees from the centerbody radial direction.

There are many possible embodiments for modulating the fuel flow rate to the burner 38. For example, a modulated fuel flow rate may be provided to one or more of the premixing nozzles. In addition, the modulated fuel flow rate may be provided to one or more of the fuel tubes on each nozzle. Furthermore, some of the fuel nozzles receiving a modulated fuel flow may receive more modulated fuel flow than the others. Regardless, the actuator 130 preferably have the capacity to provide the desired modulated fuel flow rate without inducing so large a pressure drop as to exhaust the available fuel supply pressure. Where appropriate, the actuator may comprise multiple actuators, for example multiple solenoid valves operating in parallel. In some embodiments, actuators similar to those used as fuel injectors in automobiles may be used instead of the solenoid driver described above. However, automobile fuel injectors typically do not enable as high a fuel flow rate as the solenoid valve described above, thus a plurality of such fuel injectors might be needed in order to provide the desired modulated fuel flow rate. Of course, more than one fuel line may be required to modulate and/or deliver the desired modulated fuel flow rate to the burner.

A program stored in the memory 152 includes a control algorithm that directs the engine control 34 to process the sensor signal 122 and generate the appropriate command signal to the fuel system 30. The I/O portion 154 may include a filter for filtering the magnitude of the sensor signal. The filter attenuates the magnitude of frequency components that are significantly above and significantly below the fundamental frequency range. For example, in the best mode embodiment, the filter comprises an analog band pass filter that provides–3 decibel (dB) attenuation at frequencies of 100 Hertz (Hz) and 300 Hz.

Figure 12:
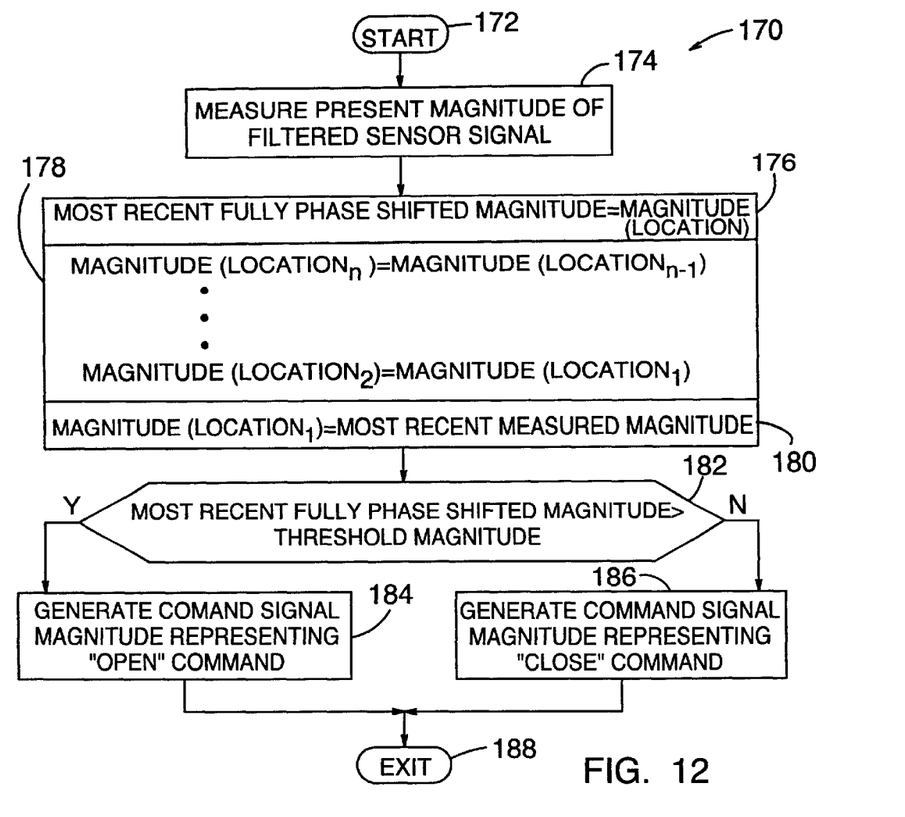
FIG. 12 is a flowchart of a control algorithm executed by the controller of FIG. 2.

Referring now to FIG. 12, a simplified flowchart diagram 170 illustrates the step execution of the control algorithm implemented by the engine controller 34 in the best mode embodiment. The algorithm is preferably executed at substantially periodic intervals, for example, approximately every 2.5 milliseconds (msec). The algorithm begins at a step 172 labeled "START". At instruction step 174, the algorithm initiates a measurement, by an analog to digital (A/D) converter, of the magnitude of the filtered sensor signal to obtain a digital representation of the magnitude at that time.

At steps 176, 178, 180, the algorithm executes an incremental phase shift. The algorithm uses a phase shifter that comprises a series, 1 to N, of memory locations, collectively referred to as a memory buffer, in the memory portion 152. Each of the memory locations stores a magnitude illustratively shown as Magnitude (Location$_1$) through Magnitude (Location$_N$). The total number, N, of memory locations in the buffer, is selected, in conjunction with the execution rate of the algorithm, to provide the desired phase shift. This type of phase shifter is well known. At step 176 the magnitude in the final memory location is transferred out of the buffer, completing the phase shift on that magnitude. At step 178 all other magnitudes previously stored in the buffer are transferred to the next respective memory location. At step 180, the algorithm stores the most recently measured magnitude in the first memory location. In the best mode embodiment, the magnitude of the phase shift is determined empirically before executing the algorithm. However, other suitable methods for determining an appropriate phase shift magnitude may also be used, including but not limited to an adaptive algorithm.

At steps 182, 184, 186, the algorithm generates a command signal based upon the magnitude for which the phase shift was most recently completed in step 176. Step 182 determines whether the magnitude is greater than a threshold magnitude e.g., zero. If so, step 184 generates a command signal having a magnitude representing an "open" command. Otherwise, step 186 generates a command signal having a magnitude representing a "close" command. Steps 184, 186 may employ a digital to analog converter to generate the command signal, which is then output to the actuator 130. The threshold magnitude may be adapted so as to result in the desired on/off duty cycle. If the oscillation is symmetrical about zero, a threshold magnitude of zero results in a 50% on/50% off duty cycle.

The algorithm exits at a step 180. With execution of this algorithm 170 over a duration, step 174 produces a series of magnitudes that collectively represent the magnitude of the filtered sensor signal over the duration. Steps 176, 178, 180 apply a time delay, or phase shift, to each magnitude produced at step 174. Steps 182, 184, 186 generate a series of command signal magnitudes, based upon the phase shifted magnitudes, that collectively represent the complete command signal over the duration.

Those skilled in the art will recognize that although the controller in the disclosed embodiment comprises programmed hardware, i.e. executed in software by a computer, it may take other forms, including hardwired hardware configurations, hardware manufactured in integrated circuit form, firmware, and combinations thereof It should be understood that although the disclosed embodiment comprises a digital system with periodically sampled signals, the present invention may also be embodied in an analog system with continuous signals, or a combination of digital and analog systems. Furthermore, although the control system in the best mode embodiment employs a constant gain and a predetermined phase shift, this does not exclude the use of an adaptive control system having a variable gain and a variable phase shift. Moreover, the controller may comprise a mechanical realization as well as an electrical one.

Figure 13:
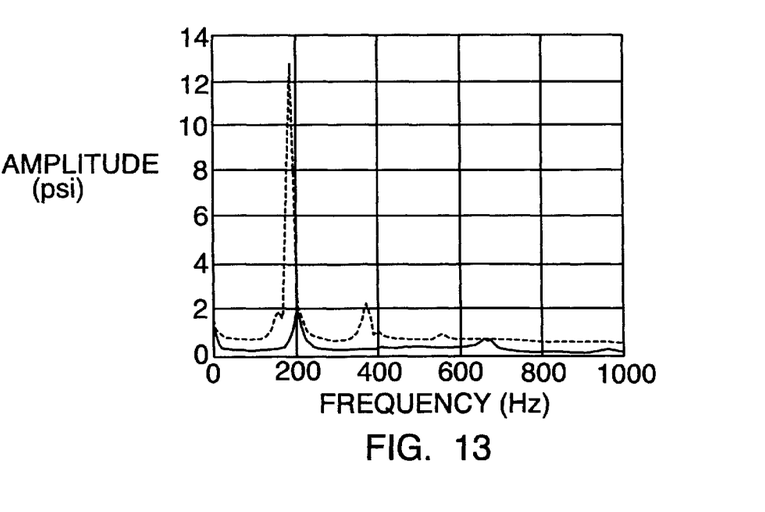
FIG. 13 is a graph illustrating the magnitude of the oscillation in the combustor pressure, both with and without use of the control system of FIG. 1.

Referring now to FIG. 13, a graph 190 displays some of the possible benefits of the present invention. The graph 190 has two curves 192, 194 that provide information collected in the embodiment above in FIG. 2. Other embodiments typically provide slightly lesser degrees of attenuation. The solid curve 192 illustrates the magnitude of the oscillations in the combustor pressure with the present invention. The dotted curve 194 illustrates the magnitude without the present invention. As with graph 120 (FIG. 6), graph 190 represents the magnitude of the oscillations as a plurality of frequency components, each having a different magnitude compared to that of the others. A comparison of the curves 192, 194 indicates that the present invention provided a 10.5 psi reduction in the magnitude of the oscillations at the fundamental frequency.

The present invention provides a reduction in the magnitude of the oscillations regardless of the fuel to air ratio.

The present invention demonstrates that premixing is not inapposite to modulation of the fuel flow rate to the combustor. The inherent mixing provided by a premixer does not neutralize the modulations in the fuel flow rate, even though the residence time of the fuel within the premixing nozzle may be greater than the period of the modulation. This is true even when the modulated fuel flow rate comprises a minority of the total fuel flow to the premixer, or less, e.g., one third, one fifth, one tenth, one twentieth, on fiftieth. Progressively smaller fractions may for example offer the opportunity to use smaller, faster responding, lighter weight, or lower power comsumption actuator valves.

While the particular invention has been described with reference to a best mode embodiment, this description is not meant to be construed in a limiting sense. Various modifications of the best mode embodiment, as well as additional embodiments of the invention, will be apparent to persons skilled in the art upon reference to this description, without departing from the spirit of the invention, as recited in the claims appended hereto. Thus, for example, the although the best mode embodiment disclosed the use of the present invention for controlling combustion instability, the present invention is not limited to such. Rather, the present invention may be used for any suitable application. It is therefore contemplated that the appended claims will cover any such modifications or embodiments as fall within the true scope of the invention.

What is claimed is:

1. Apparatus for use in a system having a gas fuel supply and a combustor that burns a mixture of gas fuel and air, the combustor having a pressure magnitude, the apparatus comprising:

a premixer in flow communication with the combustor;

a first fuel line providing substantially non-modulated fuel flow rate communication between the gas fuel supply and said premixer;

a second fuel line providing periodically modulated fuel flow rate communication between the gas fuel supply and said premixer;

a first fuel actuator associated with said second fuel line for providing said periodically modulated fuel flow;

a second fuel actuator associated with said second fuel line for further periodically modulating said modulated fuel flow; and wherein said premixer provides a mixture of gas fuel and air to the combustor, and said modulated fuel flow rate communication is adapted to substantially reduce variations in the magnitude of the pressure in the combustor.

2. The apparatus of claim 1, wherein said modulated rate of flow has a cycle period and said premixer has a mixing chamber and wherein the residence time of the fuel within said mixing chamber is at least of the same order of magnitude as the cycle period of said modulated rate of flow.

3. The apparatus of claim 1 wherein said premixer has a mixing chamber and the residence time of the fuel within said mixing chamber is at least about 4 msec.

4. The apparatus of claim 1 wherein the fuel provided by the second fuel actuator to the premixer represents only a portion of the fuel flow to the premixer, in combination with another portion of the fuel flow to the premixer to comprise a fuel flow at a quasi steady rate.

5. The apparatus of claim 1 wherein the system further includes a sensor that provides a sensor signal indicative of oscillations in the magnitude of the pressure within the combustor, said controller provides a command signal in response to said sensor signal, and burning of said mixture within the combustor effects a reduction in the magnitude of said oscillations.

6. The apparatus of claim 5, wherein said modulated rate of flow has a cycle period and said premixer has a mixing chamber and wherein the residence time of the fuel within said mixing chamber is at least of the same order of magnitude as the cycle period of said modulated rate of flow.

7. The apparatus of claim 5 wherein said premixer has a mixing chamber and the residence time of the fuel within said mixing chamber is at least about 4 msec.

8. The apparatus of claim 5 wherein the fuel provided by the second fuel actuator to the premixer represents only a portion of the fuel flow to the premixer, with another portion of the fuel flow into the premixer comprising a fuel flow at a quasi steady rate.

9. The apparatus of claim 5 wherein said premixer has a mixing chamber and the residence time of the fuel within said mixing chamber is at least about 4 msec, and wherein the fuel provided by the second fuel actuator to the premixer represents only a portion of the fuel flow to the premixer, with another portion of the fuel flow into the premixer comprising a fuel flow at a quasi steady rate.

10. The apparatus of claim 1, wherein the average rate of the modulated fuel flow is in the range of about 0.001 to about 0.33 that of the total fuel flow to the combustor.

11. The apparatus of claim 1, wherein the average rate of the modulated fuel flow is the range of about 0.01 to about 0.16 that of the total fuel flow to the combustor.

12. The apparatus of claim 1, wherein the equivalent fuel to air ratio of the mixture is in the range of from about 0.4 to about 0.6.

13. The apparatus of claim 1 further comprising a controller, wherein said controller comprises:

means for measuring a sensor signal to produce a measured signal indicative of the magnitude of the pressure within the combustor;

means for generating a phase shifted signal from said measured signal; and means for generating said command signal from said phase shifted signal.

14. The apparatus according to claim 1 wherein said second fuel actuator is disposed downstream from said first fuel actuator.

15. The apparatus according to claim 1 wherein said second fuel actuator is disposed in close proximity to said premixer.

16. The apparatus according to claim 1 wherein said second fuel actuator is a pressure actuated fuel valve.

17. The apparatus according to claim 1 wherein said second fuel actuator modulates said modulated fuel flow to reduce effects of gas compressibility in the premixer.

18. Apparatus for use in a system having a gas fuel supply and a combustor that burns a mixture of gas fuel and air, the combustor having a pressure magnitude, the apparatus comprising:

a premixer in flow communication with the combustor;

a first fuel line providing substantially non-modulated fuel flow rate communication between the gas fuel supply and said premixer;

a second fuel line providing periodically modulated fuel flow rate communication between the gas fuel supply and said premixer;

a first fuel actuator associated with said second fuel line for providing said periodically modulated fuel flow;

a second fuel actuator associated with said second fuel line for further periodically modulating said modulated fuel flow; and a controller in communication with the combustor and said second fuel line, and adapted to effect the modulated fuel flow rate so as to substantially reduce variations in the magnitude of the pressure in the combustor.

19. Apparatus for use in a system having a gas fuel supply and a combustor that burns a mixture of gas fuel and air, the apparatus comprising:

a first fuel actuator that receives gas fuel from the gas fuel supply and provides, in response to a command signal, gas fuel at a first periodically modulated rate of flow;

a second fuel actuator that receives gas fuel at said first modulated rate of flow from said first fuel actuator and provides gas fuel at a second periodically modulated rate of flow;

a controller that generates said command signal; and a premixer that receives said second modulated gas fuel flow from said second fuel actuator and further receives another gas fuel flow from the gas fuel supply such that the gas fuel received from said second fuel actuator represents only a portion of the fuel flow to the premixer, mixes the gas fuel with air, and provides the gas fuel and air mixture to the combustor.

20. Apparatus for use in a system having a gas fuel supply and a combustor that burns a mixture of gas fuel and air, the apparatus comprising:

a fuel actuator that receives gas fuel from the gas fuel supply and provides, in response to a command signal, gas fuel at a periodically modulated rate of flow;

a controller that generates said command signal corresponding to said modulated rate of flow;

a pressure actuated fuel valve that receives gas fuel from the actuator at a first periodically modulated rate of flow and provides, in response, gas fuel at a second periodically modulated rate of flow; and a premixer that receives said modulated gas fuel flow from said pressure actuated fuel valve, mixes the gas fuel with air, and provides the gas fuel and air mixture to the combustor.

21. Apparatus for use in a gas turbine engine having a gas fuel supply, a combustor that burns a mixture of gas fuel and air, and an engine case, the apparatus comprising:

a first fuel actuator, disposed within the engine case, that receives gas fuel from the gas fuel supply and provides, in response to a command signal, gas fuel at a periodically modulated rate of flow;

a pressure actuated fuel valve receiving gas fuel at a modulated rate of flow and further periodically modulating the gas fuel;

a controller that generates said command signal corresponding to said modulated rate of flow; and a premixer that receives said gas fuel flow from said fuel valve, mixes the gas fuel with air, and provides the gas fuel and air mixture to the combustor;

wherein said fuel valve is disposed in relatively close proximity to said premixer.

22. The apparatus of claim 21 further including: additional premixers receiving gas fuel at a quasi steady state rate of flow, said premixer and additional premixers mixing the gas fuel with air, and providing the gas fuel and air mixture to the combustor.

23. Apparatus for use in a system having a gas fuel supply and a combustor that burns a mixture of gas fuel and air, the apparatus comprising:

a fuel actuator system that receives gas fuel from the gas fuel supply;

a controller that generates a command signal indicative of actuation sought from said fuel actuator system;

said fuel actuator system providing, in response to said command signal, gas fuel at a periodically modulated rate of flow; and a premixer that receives the gas fuel from said fuel actuator system and further receives gas fuel at a quasi steady state rate of flow, mixes the gas fuel with air, and provides the gas fuel and air mixture to the combustor;

wherein said fuel actuator system includes a first fuel actuator providing a first periodically modulated fuel flow and a second fuel actuator receiving said first modulated fuel flow and providing a second periodically modulated fuel flow.

24. The apparatus of claims 21 or 23 wherein the controller comprises:

means for determining the actuation sought from the fuel actuator to cause the actuator to provide gas fuel at the modulated flow rate; and means for generating a command signal indicative of said actuation sought from the fuel actuator.

25. The apparatus of claim 24 wherein the system further includes a sensor that provides a sensor signal indicative of oscillations in the magnitude of the pressure within the combustor, wherein said means for determining determines the actuation sought in response to said sensor signal, and burning of the mixture within the combustor effects a reduction in the magnitude of said oscillations.

26. The apparatus of claim 25 wherein said means for determining comprises:

means for measuring said sensor signal to produce a measured signal indicative of the magnitude of the pressure within the combustor; and means for generating a phase shifted signal from said measured signal.

27. The apparatus of claim 26 wherein said means for generating a command signal comprises means for receiving said phase shifted signal and generating therefrom a command signal.

* * * * *